March 19, 1963

L. R. PEASLEE 3,082,331

TRANSISTORIZED REACTOR TIMER

Filed Sept. 24, 1958

INVENTOR:
LAWRENCE R. PEASLEE,

BY *Melvin W. Goldenberg*

HIS ATTORNEY.

March 19, 1963   L. R. PEASLEE   3,082,331
TRANSISTORIZED REACTOR TIMER
Filed Sept. 24, 1958   2 Sheets-Sheet 2
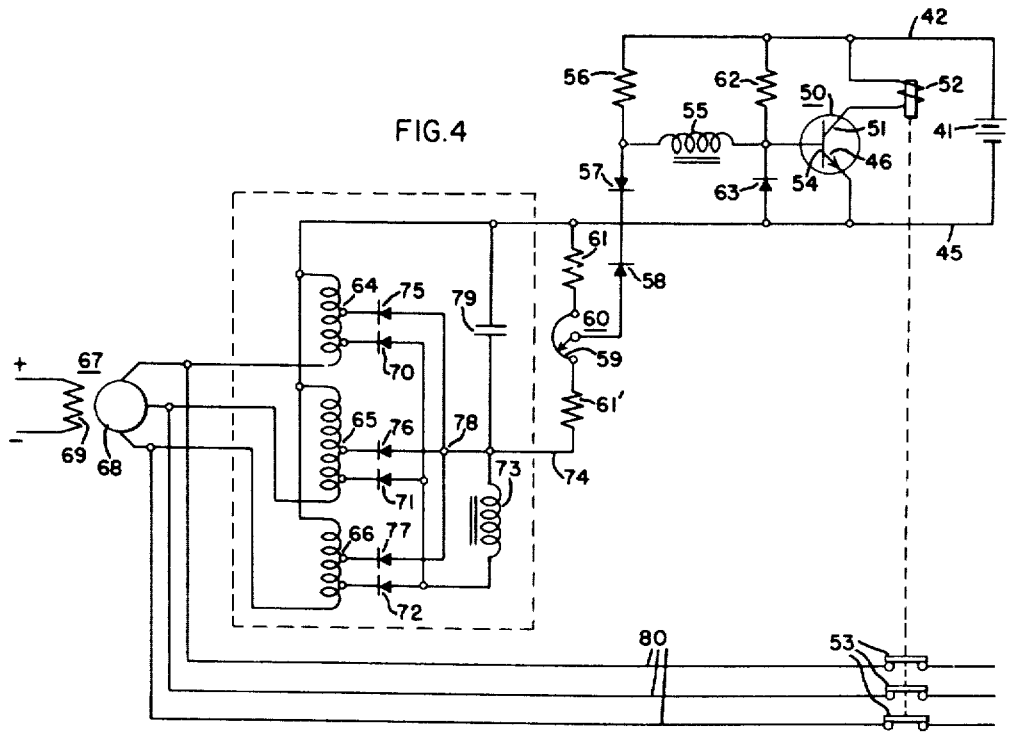
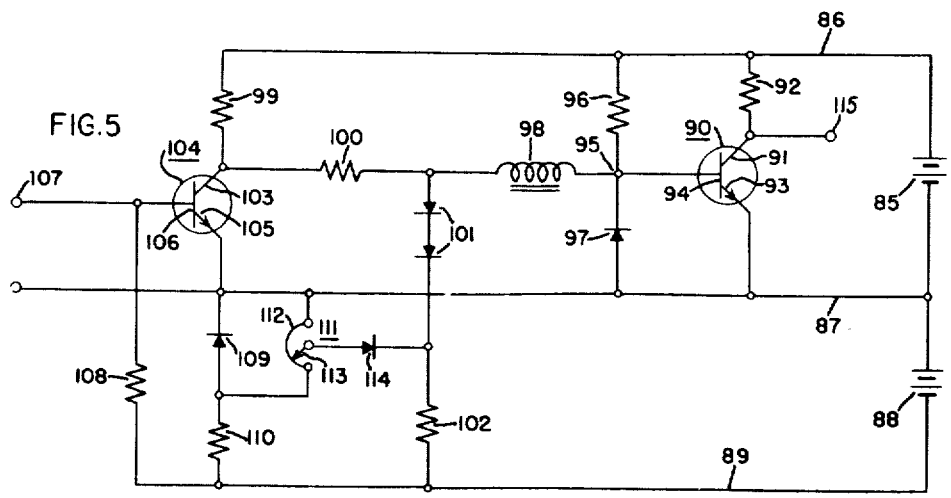
INVENTOR:
LAWRENCE R. PEASLEE,
BY *Melvin M. Goldenberg*
HIS ATTORNEY.

United States Patent Office 3,082,331
Patented Mar. 19, 1963

3,082,331
TRANSISTORIZED REACTOR TIMER
Lawrence R. Peaslee, Waynesboro, Va., assignor to General Electric Company, a corporation of New York
Filed Sept. 24, 1958, Ser. No. 763,047
15 Claims. (Cl. 307—88.5)

This invention relates to improvements in time delay devices. More particularly, it relates to improvements in so-called "static" electrical devices utilizing saturable inductive elements.

It is an object of this invention to provide a novel timing device which affords an accurate means for measuring either fixed or variable amounts of time and capable of providing a control signal after the passage of the measured time.

It is another object of this invention to provide novel apparatus for accurately measuring time associated with the duration of an electrical signal which is variable in magnitude and controlling a load after the passage of a fixed time or a time inversely proportional to the magnitude of a fixed or variable electrical signal.

It is another object of this invention to provide novel apparatus utilizing saturable and semi-conductor devices to provide a means for measuring either fixed or variable amounts of time and controlling a load after the passage of a measured amount of time.

It is still another object of this invention to provide a novel apparatus for measuring a quantity of time which is inverse to the magnitude of a voltage existing over the amount of time and controlling a load circuit.

Briefly, this invention contemplates the provision of a saturable inductive device normally maintained in one condition of saturation by the application of a voltage thereto. Upon the application of a voltage of a polarity opposite to the first-mentioned voltage, the saturable inductive device is driven into saturation in the other direction after a timed interval determined by the volt-second characteristic of the device and the signal passed thereby is amplified by suitable semi-conductor devices to control a load circuit.

The subject matter which I regard as my invention is particularly pointed out and distinctly claimed in the concluding portion of this specification. My invention, however, both as to its structure and manner of operation together with further objects and advantages thereof, may best be understood by reference to the following description taken in connection with the accompanying drawing in which:

FIGURE 4 is a schematic illustration of yet another embodiment of the invention; and FIGURE 5 is a schematic illustration of still another embodiment of the invention.

Figure 1:
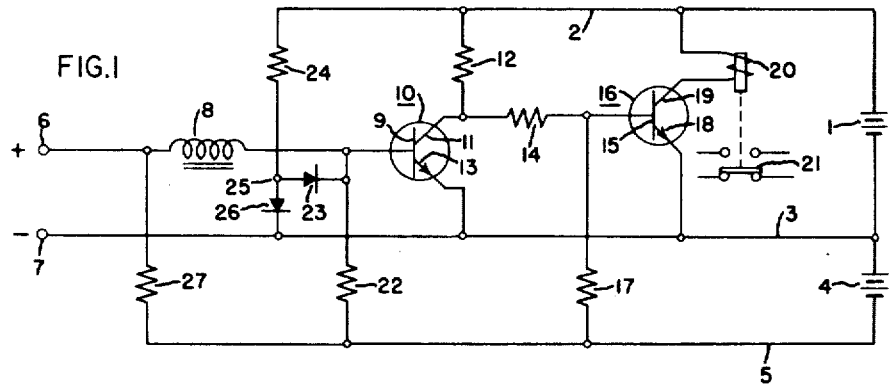
FIGURE 1 is a schematic illustration of one embodiment of the invention.

In FIGURE 1 of the drawing, there may be seen a circuit comprising a source of unidirectional potential shown for purposes of illustration as a battery 1. The positive terminal of the battery 1 is connected to a conductor 2 while its negative terminal is connected to a conductor 3. Also connected to the conductor 3 is the positive terminal of another source of unidirectional potential illustrated as the battery 4. The negative terminal of the battery 4 in turn is connected to a conductor 5. A pair of input terminals 6 and 7 are provided and connected to the input terminal 6 is one end of a saturable inductive device or reactor 8 illustrated schematically as a coil wound on a core of saturable magnetic material. The core material which is preferred for use should have ideally a square loop magnetization curve. Thus if current of a predetermined magnitude has been caused to flow in the winding thereon in one direction, the quantity of turns times current (amperes) will be effective to cause a maximum flux density of one polarity and the core is saturated in that direction. Upon the reversal of current flow, the flux density remains substantially constant until a predetermined value of turns times current (amperes) is reached. At this point, the flux density begins to build up in the opposite direction rapidly at essentially a constant volt-second rate. When the core is saturated in the opposite direction, the current through the coil increases and is determined by the applied voltage and coil resistance. The other end of the saturable device 8 is connected to the base 9 of a junction transistor 10, the collector 11 of which is connected through a current limiting resistor 12 to the conductor 2 and the emitter 13 of which is connected directly to the conductor 3. In this arrangement, it may be seen that the collector 11 is positive with respect to emitter 13 while the base 9 is negative with respect to the emitter. Thus the transistor 10 is cut off and only a slight leakage current is flowing therein. The collector 11 of the transistor 10 is connected through a coupling resistor 14 to the base 15 of a second transistor 16. The base of the second transistor 16 is connected in turn through a resistor 17 to the conductor 5 while its emitter 18 is connected to the conductor 3. The collector 19 of the transistor 16 is connected to one side of a coil 20 forming a part of an electromagnetic relay operating contacts 21. As may be seen, the other side of the coil 20 is connected to the bus 2. The connections are such that the collector 19 is positive with respect to the emitter 18. The base 15 is positive with respect to the emitter 19 due a current flow from the source 1 through conductor 2, resistances 12, 14, base 15 to emitter 18 and conductor 3 to the negative terminal of source 1. Therefore, the transistor 16 is at saturation and a collector to emitter current exists and flows through the coil 20 causing the relay to be picked up.

Returning to the transistor 10, it may be seen that its base 9 is connected by a resistor 22 to the conductor 5 and by a rectifier 23 and a resistor 24 to the conductor 2. The junction 25 of the rectifier 23 and resistor 24 is connected to the anode of a rectifier 26, the cathode of which is connected to the conductor 3. Also, the end of the saturable device 8 connected to the terminal 6 is connected to the conductor 5 through a resistor 27.

In the operation of the apparatus illustrated in FIGURE 1, the function of the saturable device 8 may be considered first. In this device, the current which may be called a reverse or reset current flows from right to left as illustrated in the drawing through the reactor 8 and resistor 27. The circuit for this current may be traced from the positive terminal of the source 1 through the resistor 24, diode 23, the coil of saturable device 8, and resistor 27 to the conductor 5 and the negative terminal of source 4. With current flow in this direction, the saturable device 8 is biased into saturation in one direction which, in accordance with polarities of the potential sources illustrated, is negative. Upon the application of a positive voltage to the terminal 6, the current through the device 8 reverses and increases to a value of exciting current while the flux density in the core builds up at essentially a constant volt-second rate if the voltage is maintained at a constant value. When positive saturation is reached, the current increases rapidly to a value which is determined by the applied voltage and the circuit impedance. The current at this point may be utilized in a manner to be described in greater detail hereinafter.

It may thus be seen that a time delay exists between the time when a voltage is applied to the terminal 6 and the time saturation is reached. This time delay is determined by the applied voltage and the volt-second characteristic of the reactor 8. Since the volt-second characteristic of the reactor 8 is essentially constant, the timing in this embodiment of the invention is inversely proportional to the magnitude of the applied voltage.

In order to sense the increased current through the reactor 8 when saturation is reached after completion of the timed interval, the invention contemplates the provision of the transistors 10 and 16 connected as D.C. amplifiers. With no signal at terminal 6 or with the circuit in the standby state, the resistor 24 and rectifier 26 constitute a voltage divider and a current from this divider flows as pointed out above through the rectifier 23, reactor 8 and resistor 27 to the conductor 5. The rectifiers 23 and 26 are selected so that the voltage drops thereacross are substantially equal and, therefore, the voltage on the base 9 of the transistor 10 is substantially zero with relation to the conductor 3. Transistor 10 is then cut off causing transistor 16 to be at saturation. The relay is picked up as the winding 20 thereof is excited because of the collector-emitter flow current of the transistor 16. Upon the application of a positive signal to the terminal 6, exciting current begins to flow through the reactor 8 and resistor 22. Since resistor 22 requires a current greater than the exciting current and since the voltage on the base 9 of the transistor 10 is zero inasmuch as it is limited by the diode 23, at the completion of the timed interval the reactor's saturation current rises rapidly causing the voltage drop across resistor 22 to be greater than the negative voltage supply. The voltage on the base 9 then increases and current begins to flow into the base of transistor 10 turning this transistor on. This causes the voltage on the collector 11 to drop and likewise the base current of transistor 16. This in turn cuts off the transistor 16 causing the coil 20 to become de-energized and the relay to drop out.

In this embodiment it may be seen that there is provided a means for effecting a timing function utilizing a saturable reactive device and an amplifier arrangement cooperating therewith, which amplifier arrangement is insensitive to exciting current flowing through the saturable reactor during the timed interval and responds only to current levels existing in the reactor at the completion of the timed interval.

Figure 2:
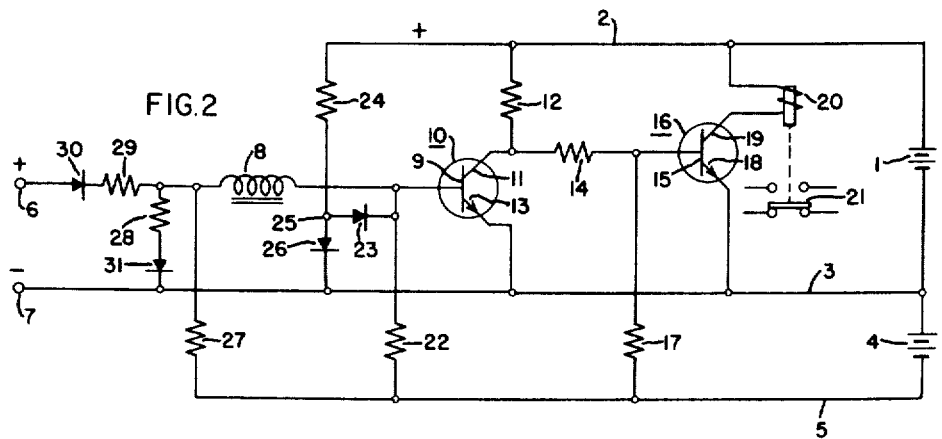
FIGURE 2 is a schematic illustration of still another embodiment of the invention.

In the circuit illustrated in FIGURE 2, corresponding elements have been given the same reference numerals as those given in connection with the description of FIGURE 1. In this embodiment of the invention, an input voltage divider has been added to increase the over-all volt-second characteristic. One end of a resistor 28 is connected to the left-hand end of the reactor 8. A resistor 29 is serially connected between the left-hand end of the reactor 8 and the terminal 6 and determines the volt-second timing characteristic and may be selected to give any predetermined value. If the signal applied to the terminal 6 is capable of going negative as well as positive, it may be found desirable to add a rectifier such as shown at 30 to prevent excessive reverse current through the reactor 8. Another rectifier 31 is connected between the other end of the resistor 28 and the conductor 3. Examination of the figure makes it clear that a reverse bias is provided on the rectifier 31 and the voltage across the saturable reactor 8 is thereby permitted to go considerably negative. By virtue of this arrangement, a relatively small value of resistance may be used for resistor 28 if timed intervals or reset times of some duration are required. If such an arrangement as shown in FIGURE 2 were not used, excessive voltages would be necessary across the reactor 8 in order to complete the timing function and energize the relay coil 20.

Figure 3:
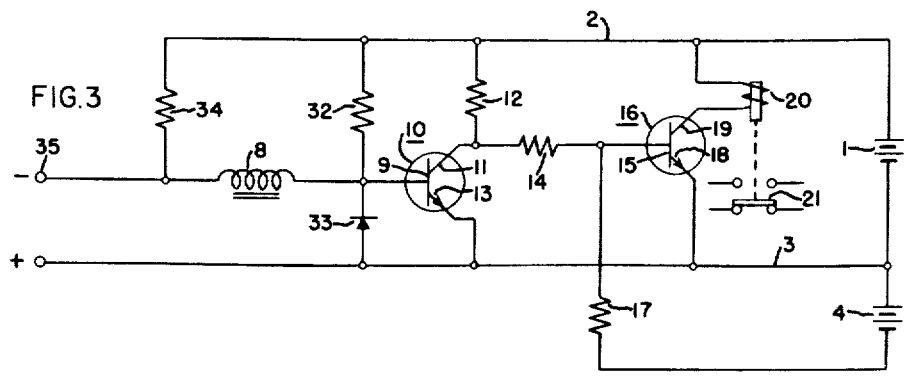
FIGURE 3 is a schematic illustration of still another embodiment of the invention.

If it is desired to reverse the operation of the device, the arrangement illustrated in FIGURE 3 which constitutes still another embodiment of my invention may be utilized. In this figure as in FIGURE 2, corresponding parts of the apparatus have been given the same reference numeral. It is to be noted in this figure that a resistor 32 is connected to the base 9 of the transistor 10 and corresponds to the resistor 22 in FIGURES 1 and 2. This arrangement provides bias for the transistor 10 and is connected to the positive conductor 2 instead of the negative conductor 3 as in FIGURES 1 and 2. A rectifying device such as the semi-conductor diode 33 may be connected between the base 9 and the conductor 3 in order to limit the negative voltage swing on the base 9 and thereby prevent damage to the transistor 10. In this arrangement, it is to be noted that a resistor 34 is connected to the left-hand side of reactor 8. Consequently, there is a current flow from the positive terminal of battery 1 through conductor 2, resistor 34, reactor 8 and to the base 9 of the transistor 10 so that the reactor 8 is biased into saturation in what may be termed the positive direction to distinguish it from the direction of saturation in the embodiments of FIGURES 1 and 2. The bias on the base 9 causes the transistor 10 to conduct and the transistor 16 is shut off due to the zero or negative voltage at the collector 11. The relay coil winding 20 is consequently de-energized. Upon the application of the negative voltage to the terminal 35, exciting current begins to flow through the reactor 8 in the manner described above until the reactor 8 is driven into saturation in the opposite direction. When the reactor 8 passes a relatively high current after saturation, the base 9 of the transistor 10 goes negative cutting off the transistor 10 causing the voltage on its collector 11 to rise and therefore the transistor 16 to conduct in the manner described above. Current flow in the transistor 16 energizes the relay coil 20 causing the relay to pick up.

FIGURE 4 of the drawing illustrates still another embodiment of the invention comprising the combination of a timing circuit as described above and a sensing circuit. In this instance, a circuit for sensing the voltage output of a polyphase synchronous alternating current generator is effective to remove the generator from the load buses in the event the voltage output of the generator exceeds a predetermined amount for a predetermined time interval which is inverse to the magnitude of the voltage.

In this form, the invention is constituted by a source of undirectional potential illustrated in the drawing by way of example as a battery 41 having its positive terminal connected to a conductor 42 and its negative terminal connected to a conductor 43. Connected to the conductor 45 is the emitter 46 of a transistor 50 having a collector electrode 51 connected through a winding 52 of a relay controlling the contacts 53. The other end of the winding 52 is connected to the conductor 42. The base 54 of the transistor 50 is connected to one end of a saturable reactor 55 having the characteristics described above, the other end of which is connected to the junction of a resistor 56 and a rectifying device 57 having characteristics similar to those of the transistor 50 for the purpose of temperature compensation. Another rectifying device 58 having a critical reverse voltage characteristic is connected to the resistance portion 59 of a potentiometer 60 which in turn is connected through a resistance 61 to the conductor 45. If necessary, additional devices such as rectifier 57 may be provided for the temperature compensation of reference rectifier 58. Connected to the junction of the reactor 55 and base 54 of the transistor 50 is a resistor 62 connected at its other end to the conductor 42. Connected to the same junction is the cathode of a rectifying device 63, the anode of which is connected to the conductor 45.

The conductor 45 is connected to one end of the windings of each of three autotransformers 64, 65 and 66. The other ends of the windings of the autotransformers 64, 65 and 66 are connected to the output terminals of an alternating current generator 67 having the armature 68 illustrated schematically and a field winding 69 supplied with a direct current from a suitable regulated source (not shown). Connected to a first tap on each of the windings of the autotransformers 64, 65 and 66 are three rectifiers 70, 71 and 72 which have their anodes tied together and connected to one side of a choke 73, the other side of which is connected to a conductor 74. Connected to second taps on the windings of the transformers 64, 65 and 66 (these second taps being at a lower voltage than the first taps) is a second set of rectifiers 75, 76 and 77, which have their anodes connected together and are connected to the conductor 74 at a junction 78. Also connected between the conductor 74 and the conductor 45 is a capacitor 79.

The generator 67 is connected to a load by the buses 80 which are arranged to be interrupted by the contacts 53 or the contacts of a suitable circuit breaker which in turn may be controlled by contacts forming a part of the relay having the coil 52 as its actuating element.

The portion of the circuit enclosed within the space indicated by the dotted lines may be termed a sensing circuit and in this particular instance is a circuit capable of sensing the average of the three phase voltages at the terminals of the generator 67 under normal conditions. However, in the event that the voltage in any one of the phases should become excessively high, this condition will be detected by the circuit and supply an overvoltage signal on the conductor 74 to initiate operation of the inverse timing circuit. The overvoltage sensing circuit is described in detail in the Patent No. 2,800,621, issued to Carlson et al. on July 3, 1957, so that its operation will be described only generally here.

The rectifiers 70, 71 and 72 form a three-phase, half-wave rectifier, the output of which is filtered by the choke 73 and the capacitor 79. Voltage developed across the capacitor 79 due to the output of the rectifiers 70, 71 and 72 represents the average voltage of the three phases. The diodes 75, 76 and 77 which, as pointed out, are connected to lower voltage points on the transformers 64, 65 and 66, constitute another half-wave rectifier so that the peak value of the voltage contributed by these rectifiers to the capacitor 79 is less than the value of the voltage contributed by the rectifiers 70, 71 and 72 as long as the three phases are reasonably well balanced. If an appreciable unbalance occurs and one phase exceeds the average of the three voltages, the capacitor 79 will charge to the peak value of the highest phase instead of the average value of all phases.

Under normal conditions, current flow from the positive terminal of the source 41 through the conductor 42, resistor 56, reactor 55 to the base 54 of the transistor 50 maintains the transistor 50 in a saturated condition and, therefore, the relay coil 52 is energized. Also, the current flow is such that the reactor 55 is maintained in saturation in one direction. The rectifying device 58 is selected to be one of the type having a critical breakdown voltage characteristic and may take the form of a Zener diode, a device in which when the reverse voltage exceeds a predetermined amount current will pass through the rectifier in the reverse direction while the voltage will remain substantially constant. As the voltage across the capacitor 79 increase in the negative direction, the diode 58 will break down causing the current in the reactor 55 to reverse and start the timing function. At the end of a time delay determined by the volt-second time constant of the reactor 55, the reactor current suddenly increases as the reactor saturates. The voltage across resistor 62 increases causing the voltage at the base 54 of the transistor 50 to drop thereby cutting off the transistor. The relay coil 52 is de-energized and actuates its contacts 53 in such a manner as to remove the generator 67 from the buses supplying the load.

This embodiment of the invention as may be seen provides a means for protecting apparatus against overvoltages of a prolonged duration but, at the same time, does not remove the generator from the line if the overvoltage is not excessively high or does not exist for an extended time interval. The design parameters of the circuit, primarily the volt-second characteristic of the reactor 55, can be selected to meet the requirements of the system. In a typical system, this might be selected so as to equal six volt-seconds. On this basis, an overvoltage of thirty volts above normal would have to exist for 0.2 second before the circuit would time out to remove the generator from the line while an overvoltage of sixty volts would have to exist for only 0.1 second before the generator was removed from the line.

FIGURE 5 of the drawing discloses still another embodiment of the invention in a form usable for measuring a fixed interval of time and providing an output signal suitable for controlling a load. In this embodiment, a source of unidirectional potential 85 is provided having its positive terminal connected to a conductor 86, while its negative terminal is connected to a conductor 87. Also connected to the conductor 87 is the positive terminal of a second source of unidirectional potential 88, the negative terminal of which is connected to a conductor 89. A transistor 90 has its collector 91 connected to the conductor 86 through a resistor 92 and its emitter 93 connected directly to the conductor 87. The base 94 of the transistor 90 is connected to a junction 95 of a resistor 96 connected to the conductor 86 and the cathode of a diode rectifier 97, the anode of which is connected to the conductor 87.

Also connected to the junction 95 is one end of the coil of a saturable inductive device 98. The other end of the coil of the device 98 is connected to a voltage divider connected across the conductors 86 and 89 and constituted by a resistor 99, a resistor 100, a pair of diodes 101 poled to conduct from conductor 86 to conductor 89 and a resistor 102. Connected to the junction of the resistors 99 and 100 is the collector 103 of a transistor 104, the emitter 105 of which is connected to the conductor 87 and the base 106 of which is connected to an input terminal 107. A resistor 108 connects the base 106 of the transistor 104 to the conductor 89. Connected between the conductors 87 and 89 in series with each other is a semi-conductor unilateral conducting device 109 having a critical reverse voltage characteristic providing a voltage reference and a resistor 110. A potentiometer 111 has its resistance segment 112 connected at one end to the conductor 87 and at the other end to the junction of the diode 109 and resistor 110. A slider 113 is connected through a diode rectifier 114 to the junction of diodes 101 and resistor 102.

In the quiescent or stand-by state, the base 106 of the transistor 104 may be approximately zero or somewhat negative with respect to its emitter 105 and the transistor 104 is therefore cut off. A positive bias is supplied to the base 94 of the transistor 90 and this voltage in conjunction with that produced by the current flow from the positive terminal of the source 85 through conductor 86, resistors 99 and 100, and device 98 is such as to cause the transistor 104 to be conducting fully or be in a saturated condition. Under these conditions, the voltage on the collector 91 is at or near zero and no output signal exists between an output terminal 115 and the conductor 87. The values of the elements in this embodiment are chosen so that the current through the saturable device 98 at this time is such as to bias it into negative saturation.

When a positive signal is applied to the input terminal 107 and therefore to the base 106 of the transistor 104, this transistor is driven into saturation and the flow of collector to emitter current causes its collector 103 to drop to nearly zero. The circuit elements constituted by diode 109, resistor 110, and potentiometer 111 comprise a reference circuit which impresses an adjustable negative potential between the anode of the diode 114 and the conductor 87. When the collector 103 of the transistor 104 drops to nearly zero, the junction of the diodes 101 and resistor 102 drops to a negative voltage the value of which is limited to the voltage between the anode of the diode 114 and the conductor 87. As may be seen, the diode 114 will conduct if the voltage on the cathode thereof becomes negative with respect to its anode and accordingly the voltage at the junction of diodes 101 and resistor 102 is held to a predetermined negative value. Current flow will then occur from the positive terminal of the source 85, through conductor 86, resistor 96, junction 95, saturable device 98, diodes 101, resistor 102 and conductor 89 to the negative terminal of source 88. As pointed out above, the reversal of the current first excites the core to reverse the direction of flux and when it reaches a predetermined value, that is saturation in the reverse direction, the current through the device 98 increases suddenly. At this point, the voltage on the base 94 of the transistor 90 drops to zero or below cutting off the transistor causing its collector voltage to rise so that positive output signal may be taken from the terminal 115. During the timing interval the current through resistor 96 to the transistor 90 is sufficient so that it is not turned off until the timed interval is complete. In this embodiment, the diode 97 may be provided to prevent the base 94 from going excessively negative so as to prevent possible damage to the transistor 90. Also, the diodes 101 function to compensate for variations in the characteristics of the transistors caused by changes in temperature.

While the embodiment of the invention illustrated in FIGURE 5 shows the output signal being derived from the terminal 115, it is obvious that a relay coil may be connected between the collector 91 and conductor 86 in lieu of the resistor 92 and the invention may be used to control a relay in the manner disclosed in connection with the other embodiments. Further, while the transistors illustrated are of the NPN types, it is clear that if it is desired to use transistors of PNP type all that is necessary is to reverse the polarities of the sources, the direction in which the rectifying devices are poled and the polarities of the input signals associated with each embodiment of the invention.

Although in accordance with the provisions of the patent statutes this invention is described in concrete form and the principle thereof has been explained together with the best mode in which it is now contemplated applying that principle, it will be understood that the apparatus shown is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. Timing apparatus comprising a signal translating stage comprising a semi-conductor device, means supplying unidirectional potential, connections from said means to said signal translating stage to bias said signal translating stage into one state of conduction, a saturable reactor having an input connection and an output connection, connections from said means to bias said saturable reactor into saturation in one direction, means for supplying a signal voltage to said input connection of said saturable reactor, said signal voltage being of a polarity and of sufficient magnitude to drive said saturable reactor into saturation in the other direction, means connecting said output connection of said saturable reactor to said signal translating stage whereby when said saturable reactor is driven into saturation in said other direction said signal translating stage is biased into another state of conduction, and load means connected to said signal translating stage to be controlled in response to the changes in the states of conduction thereof.

2. Timing apparatus comprising a semi-conductor amplifier, first means for supplying unidirectional potential, connections between said first means and said semi-conductor amplifier for biasing said semi-conductor amplifier into one state of conduction, load means connected between said first means and said semi-conductor amplifier to be controlled by the states of conduction thereof, a saturable reactor having an input circuit and an output circuit, connections including said input circuit and said output circuit between said saturable reactor and said first means for biasing said saturable reactor into saturation in one direction, means for supplying a signal voltage to said input circuit, said signal voltage being a polarity and of sufficient magnitude to drive said saturable reactor into saturation in the other direction, and connections between said output circuit and said semi-conductor amplifier whereby when said saturable reactor is driven into saturation in said other direction said semi-conductor amplifier is biased into another state of conduction and said load means is operated.

3. Timing apparatus comprising a semi-conductor amplifier, first means for supplying unidirectional potential, connections between said first means and said semi-conductor amplifier for biasing said semi-conductor amplifier into one state of conduction, load means connected between said first means and said semi-conductor amplifier to be controlled in response to the states of conduction thereof, a saturable reactor comprising a coil wound on a magnetic core having a square loop magnetization curve and having an input circuit and an output circuit, connections including said input circuit and said output circuit between said saturable reactor and said first means for biasing said saturable reactor into saturation in one direction, means for supplying a signal voltage to said input circuit, said signal voltage being a polarity and of sufficient magnitude to drive said saturable reactor into saturation in the other direction, and connections between said output circuit and said semi-conductor amplifier whereby when said saturable reactor is driven into saturation in said other direction said semi-conductor amplifier is biased into another state of conduction and said load means is operated.

4. Timing apparatus comprising a signal translating stage comprising, a first semi-conductor amplifier, a second semi-conductor amplifier, means for supplying a unidirectional potential, connections between said means and said first semi-conductor amplifier for biasing said first semi-conductor amplifier into one state of conduction, connections between said means and said second semi-conductor amplifier for biasing said second semi-conductor amplifier into another state of conduction, load means connected between said means and one of said semi-conductor amplifiers to be controlled in response to the states of conduction thereof, a saturable reactor comprising a coil wound on a core of magnetic material having a square loop magnetization curve and having an input circuit and an output circuit, connections including said input circuit and said output circuit between said saturable reactor and said means for biasing said saturable reactor into saturation in one direction, means for supplying a signal voltage of a polarity and a magnitude sufficient to drive said saturable reactor into saturation in the other direction, connections between said output circuit and one of said semi-conductor amplifiers whereby when said saturable reactor is driven into saturation in said other direction said one of said semi-conductor amplifiers is biased into another state of conduction, and a connection between said first and second semi-conductor amplifiers to bias the other of said semi-conductor amplifiers into another state of conduction when said one of said semi-conductor amplifiers is biased into said another state of conduction.

5. Timing apparatus comprising a transistor amplifier having base collector and emitter electrodes, first means for supplying unidirectional potential, connections between said first means and said base, collector and emitter electrodes for biasing said transistor into one state of conduction, load means included in said connections between said first means and said collector electrode to be controlled in response to the states of conduction of said transistor, a saturable reactor comprising a coil wound on a magnetic core having a square loop magnetization curve and having an input circuit and an output circuit, connections between said input circuit and said output circuit and said first means for biasing said saturable reactor into saturation in one direction, means for supplying to said input circuit a signal voltage of a polarity and a magnitude sufficient to drive said saturable reactor into saturation in the other direction, and a connection between said output circuit and said base electrode whereby when said saturable reactor is driven into saturation in said other direction the relative potentials of all of said transistor electrodes are changed to bias it into another state of conduction to control said load means.

6. Timing apparatus comprising a saturable reactor comprising a coil wound on a magnetic core having a square loop magnetization curve and having an input circuit and an output circuit, means supplying unidirectional potential, connections between said means and said input and output circuit for biasing said saturable reactor into saturation in one direction, a signal translating stage connected to said output circuit and being in one state of conduction, a load means connected to said signal translating stage to be controlled in response to the change in state of conduction thereof, means supplying a signal voltage to said input circuit of a polarity and a magnitude sufficient to drive said saturable reactor into saturation in the other direction, said signal translating stage being insensitive to current flow in said saturable reactor when said signal voltage is supplied to said input circuit until said saturable reactor is driven into saturation in said other direction and being subsequently sensitive to current flow after said saturable reactor is driven into saturation in said other direction to change from said first-mentioned state of conduction to another state of conduction to control said load means.

7. Timing apparatus comprising a transistor amplifier having base, collector and emitter electrodes, first means for supplying unidirectional potential, connections between said means and said base, collector and emitter electrodes for biasing said transistor into one state of conduction, load means included in said connections between said first means and said collector electrode to be controlled in response to the states of conduction of said transistor, a saturable reactor comprising a coil wound on a magnetic core having a square loop magnetization curve and having an input circuit and an output circuit, connections between said input circuit and said output circuit and said first means for biasing said saturable reactor into saturation in one direction, means for supplying to said input circuit a signal voltage of a polarity and a magnitude sufficient to drive said saturable reactor into saturation in the other direction, and a connection between said output circuit and said base electrode whereby when said saturable reactor is driven into saturation in said other direction the relative potentials of all of said transistor electrodes are changed to bias it into another state to control said load means, and a voltage divider connected between said means for supplying a signal voltage and said input circuit for decreasing the level of said signal voltage to lengthen the time necessary to drive said saturable reactor into saturation in said other direction.

8. Timing apparatus comprising a first transistor amplifier having base, collector and emitter electrodes, means for supplying unidirectional potential, load means connected to said collector electrode and to a positive terminal of said means, said emitter electrode being connected to a negative terminal of said means, resistance means connected between said base electrode and a negative terminal of said means, a second transistor amplifier having base, collector and emitter electrode, said collector electrode of said second transistor being connected to a positive terminal of said means and to said base electrode of said first transistor, said emitter electrode of said second transistor being connected to a negative terminal of said means, second resistance means connecting said base electrode of said second transistor to a positive terminal of said means whereby said second transistor is normally biased into a conducting state and said first transistor is normally biased into a non-conducting state, a saturable reactor comprising a coil wound on a magnetic core having a square loop magnetization curve and having an input circuit and an output circuit, said input circuit being connected to a positive terminal of said means, said output circuit being connected to said base electrode of said second transistor, and means for supplying a signal voltage to said input circuit to drive said saturable reactor into saturation in the other direction and to bias said second transistor to a non-conducting state and said first transistor into a conducting state when said saturable reactor is driven into saturation in said other direction.

9. Timing apparatus comprising a first transistor amplifier having base, collector and emitter electrodes, means for supplying unidirectional potential, load means connected to said collector electrode and to a positive terminal of said means, said emitter electrode being connected to a negative terminal of said means, resistance means connected between said base electrode and a negative terminal of said means, a second transistor amplifier having base, collector and emitter electrodes, said collector electrode of said transistor being connected to a positive terminal of said means and said base electrode of said first transistor, said emitter electrode of said second transistor being connected to a negative terminal of said means, second resistance means connecting said base electrode of said second transistor to a negative terminal of said means whereby said second transistor is normally biased into a non-conducting state and said first transistor is normally biased into a conducting state, a saturable reactor comprising a coil wound on a magnetic core having a square loop magnetization curve and having an input circuit and an output circuit, said input circuit being connected to a negative terminal of said means, said output circuit being connected to said base electrode of said second transistor whereby said saturable reactor is driven into saturation in one direction, and means for supplying a signal voltage to said input circuit to drive said saturable reactor into saturation in the other direction and to bias said second transistor to a conducting state and said first transistor into a non-conducting state when said saturable reactor is driven into saturation in said other direction.

10. In combination, means for sensing a voltage in excess of a predetermined magnitude, timing apparatus comprising a saturable reactor comprising a coil wound on a magnetic core having a square loop magnetization curve and having an input circuit and an output circuit, means for supplying unidirectional potential, connections between said last-mentioned means and said input and output circuits for biasing said saturable reactor into saturation in one direction, a signal translating stage connected to said output circuit and being in one state of conduction, a load means connected to said signal translating stage to be controlled in response to the change in state of conduction thereof, connections between said first-mentioned means and said input circuit whereby when a voltage in excess of a predetermined magnitude is sensed a signal voltage is supplied to said saturable reactor to drive said saturable reactor into saturation in the other direction, said signal translating stage being connected to said output circuit and being insensitive to current flow in said saturable reactor when said signal voltage is supplied to said input circuit until said saturable reactor is driven into saturation in said other direction and being subsequently sensitive to current flow after said saturable reactor is driven into saturation in said other direction to change from said first-mentioned state of conduction to another state of conduction to control said load means.

11. In combination, means for sensing a voltage in excess of a predetermined magnitude, timing apparatus comprising a saturable reactor comprising a coil wound on a magnetic core having a square loop magnetization curve and having an input circuit and an output circuit, first means for supplying unidirectional potential, connections between said first means and said input and output circuits for biasing said saturable reactor into saturation in one direction, a transistor amplifier connected to said output circuit and the first means and normally biased to be in one state of conduction, load means connected between said transistor amplifier and said first means to be controlled in response to the states of conduction of said transistor amplifier, connections between said first means and said input circuit whereby a voltage in excess of a predetermined magnitude is sensed to supply a signal voltage to said saturable reactor to drive said saturable reactor into saturation in the other direction, and to bias said transistor amplifier into another state of conduction to control said load means.

12. In combination, means sensing a voltage in excess of a predetermined magnitude, a saturable reactor comprising a coil wound on a core of magnetic material having a square loop magnetization curve and having an output circuit and an input circuit, a transistor amplifier including base, collector and emitter electrodes, means for supplying unidirectional potential, a connection between a positive terminal of said supply means and said collector electrode, said connection including a load means to be controlled in response to the conduction of said amplifier, a connection between the emitter electrode and a negative terminal of said supply means, a resistance element connected between said base electrode and a positive terminal of said supply means whereby said transistor is normally biased into a conducting state, said output circuit being connected to said base electrode, means connecting said input circuit to a positive terminal of said supply means, and means connecting said sensing means to said input circuit to supply a signal voltage thereto when a voltage in excess of a predetermined magnitude is sensed to drive said saturable reactor into saturation in the other direction and to bias said transistor to a non-conducting state when said saturable reactor is driven into saturation in said other direction.

13. Timing apparatus comprising a transistor amplifier, means supplying unidirectional potential, connections between said transistor amplifier and said means whereby said transistor amplifier is normally biased into one state of conduction, a saturable reactor comprising a coil wound on a core of magnetic material having a square loop magnetization curve and having an input circuit and an output circuit, connections including said input and output circuits between said saturable reactor and said means whereby said saturable reactor is driven into saturation in one direction, means connecting said output circuit to said transistor amplifier, means for supplying a signal voltage, means responsive to a signal voltage of given magnitude and polarity to develop a voltage of a polarity and a magnitude sufficient to drive said saturable reactor into saturation in the other direction and means to limit said last-mentioned voltage to a predetermined value.

14. Timing apparatus comprising a transistor amplifier having base, collector and emitter electrodes, means supplying unidirectional potential, said collector electrode being connected to a positive terminal of said means, said emitter electrode being connected to a negative terminal of said means, a resistance element connecting said base electrode to a positive terminal of said means whereby said transistor is normally biased to a conducting state, a saturable reactor comprising a coil wound on a magnetic core and having an input circuit and an output circuit, connections including said input and output circuits between said saturable reactor and said means to drive said saturable reactor into saturation in one direction, said output circuit being connected to said base electrode, means for supplying a signal voltage, a signal translating stage responsive to the signal voltage to develop a control voltage when the signal voltage exceeds a predetermined value, means connecting said input circuit to said signal translating stage, and means to limit said control voltage to a predetermined value.

15. Timing apparatus comprising a transistor amplifier having base, collector and emitter electrodes, first means supplying unidirectional potential, said collector electrode being connected to a positive terminal of said first means, said emitter electrode being connected to a negative terminal of said first means, a resistance element connecting said base electrode to a positive terminal of said first means whereby said transistor is normally biased to a conducting state, a staurable reactor comprising a coil wound on a magnetic core and having an input circuit and an output circuit, connections including said input and output circuits between said saturable reactor and said first means to drive said saturable reactor into saturation in one direction, said output circuit being connected to said base electrode, a second transistor amplifier, connections between said second transistor amplifier and said first means for normally biasing said second transistor into a non-conducting state, means for supplying a signal voltage to said second transistor for biasing it into a conducting state, connections between said second transistor and said input circuit to supply a control voltage to said saturable reactor whereby when said second transistor is in a conducting state said saturable reactor is driven into saturation in the other direction and said first-mentioned transistor is biased into a non-conducting state, and means for limiting the control voltage to a predetermined value.

References Cited in the file of this patent

UNITED STATES PATENTS

| | | |
|---|---|---|
| 2,729,808 | Auerbach et al. | Jan. 3, 1956 |
| 2,760,088 | Pittman et al. | Aug. 21, 1956 |
| 2,876,440 | Eckert | Mar. 3, 1959 |
| 2,897,380 | Neitzert | July 28, 1959 |

UNITED STATES PATENT OFFICE
CERTIFICATE OF CORRECTION

Patent No. 3,082,331                                          March 19, 1963

Lawrence R. Peaslee

It is hereby certified that error appears in the above numbered patent requiring correction and that the said Letters Patent should read as corrected below.

Column 5, line 59, for "increase" read -- increases --; column 11, line 8, for "and the first means" read -- and to said first means --.

Signed and sealed this 12th day of November 1963.

(SEAL)
Attest:
ERNEST W. SWIDER

Attesting Officer

EDWIN L. REYNOLDS

Acting Commissioner of Patents